United States Patent [19]

Igarashi et al.

[11] Patent Number: 5,432,222
[45] Date of Patent: Jul. 11, 1995

[54] POLYVINYL CHLORIDE RESIN COMPOSITION FOR POWDER MOLDING

[75] Inventors: Toshio Igarashi, Kyoto; Akira Wakatsuki, Ibaraki; Yoshihiro Nakatsuji, Toyonaka; Yuu Shida, Takatsuki; Hikaru Shimizu, Osaka, all of Japan

[73] Assignee: Sumitomo Chemical Company, Limited, Osaka, Japan

[21] Appl. No.: 277,301

[22] Filed: Jul. 22, 1994

Related U.S. Application Data

[63] Continuation of Ser. No. 165,585, Dec. 13, 1993, abandoned, which is a continuation of Ser. No. 761,243, Sep. 17, 1991, abandoned.

[30] Foreign Application Priority Data

Sep. 25, 1990 [JP] Japan ................... 2-256448

[51] Int. Cl.$^6$ .............................................. C08K 5/04
[52] U.S. Cl. ........................................ 524/399; 524/400
[58] Field of Search ................................ 524/399, 400

[56] References Cited

U.S. PATENT DOCUMENTS 4,224,218  9/1980  Minagawa ................ 260/45.7 PH
4,861,816  8/1989  Kobayashi et al. ............ 524/204

FOREIGN PATENT DOCUMENTS 0273766   7/1988   European Pat. Off.
2574684   6/1986   France
1-215845  8/1989   Japan
2192004  12/1987   United Kingdom

OTHER PUBLICATIONS

Research Disclosure, p. 155, No. 310, Feb. 1990.
Chemical Abstracts, vol. 112, 1990, Abstract 112:140568x.

*Primary Examiner*—Peter D. Mulcahy
*Attorney, Agent, or Firm*—Wenderoth, Lind & Ponack

[57] ABSTRACT

A powder molding composition containing dry-blended polyvinyl chloride resins, plasticizers and stabilizers, which is characterized in that there are blended therein 0.05 to 5 parts by weight of barium salt of a carboxylic acid having a melting point not lower than 250° C. and 0.01 to 5 parts by weight of zinc salt of a fatty acid containing 10 or more carbon atoms, per 100 parts by weight said polyvinyl chloride resins. The composition of the invention is excellent in releasability and resistance to mold staining.

8 Claims, No Drawings

POLYVINYL CHLORIDE RESIN COMPOSITION FOR POWDER MOLDING

This application is a continuation of now abandoned application, Ser. No. 08/165,585, filed Dec. 13, 1993, which is a continuation of now abandoned application, Serial No. 07/761,243, filed September 17, 1991.

This invention relates to a polyvinyl chloride powder molding composition for producing molded articles suited for use in the field of automobiles or the like.

Recently, there is an increasing demand for interior covering materials of automobiles, such as crash pads, armrests, headrests, console boxes, meter hoods and door trims, which are light in weight and excellent in the feeling of softness and, at the same time, provided with embossed or stitched patterns of sophisticated sense.

In recent years, much attention has been focused on powder molding as a method for producing such covering materials.

In general, the powder molding method includes fluidized bed coating, electrostatic coating, powder flame spray coating, powder rotational molding, powder slush molding and other techniques. Of these techniques, the powder rotational molding and powder slush molding can be most suited for the production of covering materials for automobile interior parts.

A powder molding composition can be prepared by dry-blending a polyvinyl chloride resin with plasticizers, stabilizers, pigments, etc., using a blender or high-speed rotating mixer equipped with a heating jacket.

In powder molding, a powder composition is fusion-adhered to a mold maintained at a high temperature, and hence the surface of the mold is gradually stained with accumulation of additives or the like as the number of molding shots increases.

When the staining of the mold proceeds, the hollows of embossed patterns formed on the interior surface of the mold become shallow because of the accumulation of stains, and covering materials produced by using the mold come to assume an undesirable gloss. In general, covering materials of automobiles are designed to have the same color tone as that of accessories and other parts. However, if covering materials so molded assume such an undesirable gloss, their apparent color tone may appear to be different from that of accessories and other parts. This phenomenon significantly impairs the color harmony and quality of automobiles. In the case where the covering materials are used for crush pads, meter covers or the like, such a gloss can also be detrimental to the safety of drivers of the automobile and of automobiles running on the opposite lane, due to reflection of light.

In order to remove the stains, molds are cleaned with alkaline solutions, acid solutions, halogenated hydrocarbon solvents, or the like. In the case where such a chemical cleaning is insufficient in its cleaning effects, molds are cleaned by means of mechanical brushing, whereby alumina powders or glass beads are injected together with air to remove the stains. However, the above cleaning methods are disadvantageous with regard to productivity and cost since the molding operation must be stopped temporarily and a spare mold may be prepared. In the case where chemical agents are used, special care must be taken on the working environment and waste disposal. In addition, if mechanical brushing is applied repeatedly, the hollows of embossed patterns on the interior surface of the mold becomes shallow, and the life of the mold is shortened.

It is therefore highly important from industrial and economical points of view to develop a powder molding composition which is excellent in the resistance to mold staining and hence does not stain molds in the course of molding.

However, a powder molding composition which is excellent in resistance to mold staining tends to be poor in releasability between the mold and the molded article. Because of this, articles produced from such a composition suffer from deformation and breakage. It is known that the releasability can be improved by applying a releasing agent, such as silicone compounds or fluorine-containing compounds, to the mold prior to the molding operation. However, this technique is poor in productivity and suffers from the problem that molded products become undesirably glossy due to transfer of the releasing agent to molded articles.

Japanese Patent Kokai No. 215,845/89 discloses a powder molding resin composition having improved properties with regard to resistance to mold staining and releasability. The powder molding composition is mixed with a zinc or barium salt of acids selected from the group consisting of aromatic organic acids, naphthenic acids and fatty acids containing 5 to 8 carbon atoms in the alkyl group thereof. However, when the composition is molded in a mold kept at a high temperature, the additive tends to plate-out onto the surface of the mold together with plasticizers since it is highly compatible with plasticizers.

Because of this, when the molding is carried out repeatedly over a long period of time, the additive accumulates on the surface of the mold and, as a result, molded articles assume an undesirable gloss. In addition, the composition also contains a polyacrylic releasing agent which tends to accumulate on the mold, thereby forming thermally modified hard stains which could hardly be removed by washing.

It is therefore an object of the present invention to provide a powder molding resin composition excellent in both mold-staining resistance and releasability.

The present invention provides a powder molding resin composition containing dry-blended polyvinyl chloride resins, plasticizers and stabilizers, characterized in that there are blended therein 0.05 to 5 parts by weight of barium salt of a carboxylic acid having a melting point not lower than 250° C. and 0.01 to 5 parts by weight of zinc salt of a fatty acid containing 10 or more carbon atoms, per 100 parts by weight of said polyvinyl chloride resins. The powder molding composition of the invention is excellent in both mold-staining resistance and releasability.

The present invention will further be explained hereinbelow.

Upon powder molding, the powder molding composition is usually fusion-adhered to a mold maintained at a temperature in the range of 180° to 250° C. When the temperature of the mold is lower than 180° C., the composition will be fused only to an insufficient degree, and hollows and pin holes will be formed on the surface of molded articles. When the temperature of the mold is mope than 250° C., the result will be an undesirable discoloration or decomposition of molded articles.

In the present invention, there are used barium salts of carboxylic acids which have a melting point not lower than 250° C. Such barium salts improve the mold-staining resistance by preventing the undesirable plating-out of plasticizers onto the surface of the mold at the time of molding.

As examples of barium salts of carboxylic acids usable in the invention, mention may be made of barium oxalate, barium malonate, barium maleate, barium tartrate, barium benzoate, barium p-t-butylbenzoate, barium succinate, barium glutamate, barium adipate, barium pimelate, barium suberate, barium azelate, barium sebacate, barium racemate, barium malate, barium phthalate, barium isophthalate, barium terephthalate, barium salicylate, barium anthranilate, barium mandelate, and the like.

The barium salts of carboxylic acids are used in an amount of 0.05 to 5 parts by weight, preferably 0.1 to 3 parts by weight, per 100 parts by weight of the polyvinyl chloride resin. When the salts are used in an amount less than 0.05 parts by weight, the result will be an insufficient heat resistance at the time of molding, whereas when the salts are used in an amount greater than 5 parts by weight, there will be formed molded articles which have an undesirably low strength and hence could hardly be put into practical use.

In the present invention, there are also used zinc salts of fatty acids (hereinafter referred to as "zinc soaps") which contain 10 or more carbon atoms, preferably 10 to 20 carbon atoms.

As examples of zinc soaps usable in the invention, mention may be made of zinc caprate, zinc undecylate, zinc laurate, zinc tridecylate, zinc myristate, zinc pentadecylate, zinc palmitate, zinc heptadecylate, zinc stearate, zinc oleate, zinc linoleate, zinc linolenate, zinc ricinoleate, zinc arachinate, and the like.

The zinc soaps are used in an amount of 0.01 to 5 parts by weight, preferably 0.01 to 2 parts by weight, per 100 parts by weight of the polyvinyl chloride resin. When the zinc soaps are used in an amount less than 0.01 parts by weight, the results will be an insufficient releasing effect. When the zinc soaps are used in an amount greater than 5 parts by weight, the result will be an undesirable worsening in mold-staining resistance and thermal stability. In extreme cases, bruming may also result.

Examples of polyvinyl chloride resins usable in the invention include polymers of polyvinyl chloride, and copolymers of vinyl chloride and copolymerizable monomers, such as ethylene, propylene, vinyl acetate, alkyl acrylates and alkyl methacrylates, both of which may be prepared by suspension polymerization, block polymerization or emulsion polymerization. Other examples include graft copolymers prepared by grafting vinyl chloride onto a copolymer of ethylene and vinyl acetate; and mixtures of two or more of the above (co)polymers. However, polyvinyl chloride resins usable in the invention are not limited to these.

As examples of plasticizers usable in the invention, mention may be made of esters of phthalic acids, such as diisodecyl phthalate, diisoundecyl phthalate and dialkyl phthalates containing 9 to 11 carbon atoms in the alkyl groups thereof; and esters of trimellitic acid, such as trioctyl trimellitate, tri-2-ethylhexyl trimellitate, tridecyl trimellitate and trialkyl trimellitate containing 7 to 11 carbon atoms in the alkyl groups thereof. It is also possible to use epoxy plasticizers, polyester plasticizers or the like in small quantities. However, plasticizers usable in the invention are not limited to these.

The composition of the invention can additionally contain a stabilizer, such as magnesium oxide, magnesium hydroxide, hydrotalcites, zinc oxide, barium oxide, calcium oxide, barium phosphate, and the like. It is also possible to use antioxidants, such as phenolic and thioether compounds; UV absorbers, such as hindered amines, phosphites, diketo compounds, salicylic acid esters, benzophenones and triazoles; and others, such as epoxidized soybean oil and an epoxy compound synthesized from bisphenol A and epichlorohydrin. It can be particularly preferable to use a double salt of zinc and barium in combination with hydrotalcite since the use of such a combination brings about an increased heat resistance upon superposition of urethanes.

If necessary, the powder molding composition of the invention can additionally contain other additives, such as pigments, fillers, foaming agents, and the like.

The quantity of polyvinyl chloride resins (100 parts by weight) in the definition of the invention is based on the total of the weight of the polyvinyl chloride resins added before dry-blending and that of fine particles of polyvinyl chloride resins which may be added after the completion of dry-blending.

As described hereinabove, there can be obtained by the present invention a powder molding vinyl chloride resin composition which can be excellent in both mold-staining resistance and releasability, due to the addition of the particular additives.

The present invention will be explained in further detail by examples. It should however be noted that the invention is by no means limited to these.

EXAMPLES 1 to 5

Into a super-mixer was charged 90 parts by weight of a polyvinyl chloride resin (Sumilit® (Sx-8G by Sumitomo Chemical Co., Ltd.; polymerization degree, 800), and the resin was stirred with heating at a constant rotation speed. At the time when the temperature of the resin reached 80° C., there were added 70 parts by weight of a plasticizer (diisodecyl phthalate), 2 parts by weight of epoxidized soybean oil, a small quantity of pigment, and stabilizers of the kinds and quantities shown in Table 1, and the resulting mixture was dry-blended.

At the time when the temperature of the dry-blend mixture reached 120° C., cooling was initiated. After the mixture had been cooled to 50° C. or below, 10 parts by weight of fine particles of a polyvinyl chloride resin (Sumilit® Px-Q by Sumitomo Chemical Co., Ltd.; polymerization degree, 1,300) was uniformly dispersed thereinto, to obtain a powder molding polyvinyl chloride resin composition.

COMPARATIVE EXAMPLE 1

A composition was prepared in the same manner as in Example 1, except that barium octanoate (which is a liquid at room temperature (25° C.)) and zinc octanoate (which contains 8 carbon atoms) were used in quantities shown in Table 1.

COMPARATIVE EXAMPLE 2

A composition was prepared in the same manner as in Example 2, except that zinc salt of benzoic acid (which contains 7 carbon atoms) was used instead of zinc laurate.

COMPARATIVE EXAMPLE 3

A composition was prepared in the same manner as in Comparative Example 2, except that a polyacrylic acid compound (LS-5, product of Adeka-argus Co., Ltd.)

was used as a releasing agent in the quantity shown in Table 1.

COMPARATIVE EXAMPLE 4

A composition was prepared in the same manner as in Example 2, except that zinc salt of octanoic acid (which contains 8 carbon atoms) was used in the quantity shown in Table 1, instead of zinc laurate.

COMPARATIVE EXAMPLE 5

A composition was prepared in the same manner as in Example 2, except that zinc laurate was not used.

COMPARATIVE EXAMPLE 6

A composition was prepared in the same manner as in Example 5, except that barium maleate and zinc stearate were used in quantities shown in Table 1.

COMPARATIVE EXAMPLE 7

A composition was prepared in the same manner as in Example 1, except that barium stearate (melting point, 220° C.) was used in the quantity shown in Table 1, instead of barium oxalate.

The compositions prepared in Examples 1 to 5 and Comparative Examples 1 to 7 were evaluated in the following manner.

(1) Evaluation of Mold-Staining Resistance

An embossed nickel mold of 100 mm×100 mm×3 mm (thickness) was heated on an electric hot plate. When the temperature of the mold reached 230° C., a composition prepared in one of the above examples was sprinkled over the mold and fuse-adhered thereto for 10 seconds. After unfused powder had been removed, the mold was again placed on the hot plate and heated for 30 seconds to complete the fusion. Thereafter, the mold was cooled with water, and the molded article was released. After this procedure had been repeated 800 times, the degree of stain on the mold was observed and evaluated.

Results obtained are shown in Table 1.

(2) Evaluation of Releasability

An embossed nickel mold of 150 mm×300 mm×3 mm (thickness) was heated to 230° C., and a composition prepared in one of the above examples was immediately sprinkled over the mold and fuse-adhered thereto for 10 seconds. After unfused powder had been removed, the mold was placed in a heating furnace maintained at 280° C. and heated for 1 minute to complete the fusion. Thereafter, the mold was cooled to 70° C., and the molded article was released. This procedure was repeated 10 times. Upon the 10th releasing operation, the releasing strength (or peeling strength) between the mold and the molded article was determined by using a spring scale.

Results obtained are shown in Table 1.

TABLE 1

| | Barium Salt of Carboxylic Acid (parts by weight) | | | | | Zinc Soap (parts by weight) | | | |
| --- | --- | --- | --- | --- | --- | --- | --- | --- | --- |
| | Barium Oxalate | Barium Maleate | Barium Benzoate | Barium Octanoate | Barium Stearate | Zinc Benzoate | Zinc Octanoate | Zinc Laurate | Zinc Stearate |
| Example 1 | 1.0 | — | — | — | — | — | — | — | 1.0 |
| Example 2 | — | 1.0 | — | — | — | — | — | 1.0 | — |
| Example 3 | — | 1.0 | — | — | — | — | — | — | 1.0 |
| Example 4 | — | — | 1.0 | — | — | — | — | — | 1.0 |
| Example 5 | — | 3.0 | — | — | — | — | — | — | 3.0 |
| Comparative Example 1 | — | — | — | 1.0 | — | — | 1.0 | — | — |
| Comparative Example 2 | — | 1.0 | — | — | — | 1.0 | — | — | — |
| Comparative Example 3 | — | 1.0 | — | — | — | 1.0 | — | — | — |
| Comparative Example 4 | — | 1.0 | — | — | — | — | 1.0 | — | — |
| Comparative Example 5 | — | 1.0 | — | — | — | — | — | — | — |
| Comparative Example 6 | — | 7.0 | — | — | — | — | — | — | 7.0 |
| Comparative Example 7 | — | — | — | — | 1.0 | — | — | — | 1.0 |

| | Releasing Agent (parts by weight) Polyacrylic Acid Compound | Staining of Mold | | | | Releasing Strength (g/125 mm) |
| --- | --- | --- | --- | --- | --- | --- |
| | | At 100 Times | At 200 Times | At 400 Times | At 800 Times | |
| Example 1 | — | A | A | B | B | 100 |
| Example 2 | — | A | A | B | B | 110 |
| Example 3 | — | A | A | B | B | 100 |
| Example 4 | — | A | A | B | B | 120 |
| Example 5 | — | A | A | B | C | 90 |
| Comparative Example 1 | — | B | C | E | E | 140 |
| Comparative Example 2 | — | A | A | B | B | 260 |
| Comparative Example 3 | 1.0 | A | B | E | E | 90 |
| Comparative Example 4 | — | A | A | B | B | 260 |
| Comparative Example 5 | — | A | A | B | B | 270 |
| Comparative Example 6 | — | B | C | E | E | 80 |
| Comparative Example 7 | — | E | E | E | E | 70 |

TABLE 1-continued

Example 7

[Notes]
A: No staining was observed.
B: Traces of staining.
C: Slight staining was observed.
D: Substantial staining was observed.
E: Heavy staining was observed.

What is claimed is:

1. A polyvinyl chloride powder molding composition containing
   a dry blend of a polyvinyl chloride resin, a plasticizer other than the barium and zinc salts recited hereinafter, and a stabilizer other than the barium and zinc salts recited hereinafter,
   0.05 to 5 parts by weight, per 100 parts by weight of the polyvinyl chloride resin, of at least one barium salt of a carboxylic acid having a melting point not lower than 250° C. selected from the group consisting of barium oxalate, barium maleate and barium benzoate, blended in the dry blend, and 0.01 to 5 parts by weight, per 100 parts by weight of the polyvinyl chloride resin, of a zinc salt of a fatty acid selected from the group consisting of zinc caprate, zinc undecylate, zinc laurate, zinc tridecylate, zinc myristate, zinc pentadecylate, zinc palmitate, zinc heptadecylate, zinc stearate and zinc arachinate, blended in the dry blend.

2. A method for improving mold-staining resistance and releasability of a polyvinyl chloride powder molding resin composition, which comprises blending in a powder molding composition containing a dry blend of a polyvinyl chloride resin, a plasticizer other than the barium and zinc salts recited hereinafter, and a stabilizer other than the barium and zinc salts recited hereinafter,
   0.05 to 5 parts by weight, per 100 parts by weight of the polyvinyl chloride resin, of at least one barium salt of a carboxylic acid having a melting point not lower than 250° C. selected from the group consisting of barium oxalate, barium maleate and barium benzoate, and
   0.01 to 5 parts by weight, per 100 parts by weight of the polyvinyl chloride resin, of a zinc salt of a fatty acid selected from the group consisting of zinc caprate, zinc undecylate, zinc laurate, zinc tridecylate, zinc myristate, zinc pentadecylate, zinc palmitate, zinc heptadecylate, zinc stearate and zinc arachinate.

3. A powder molding composition as claimed in claim 1, wherein said barium salt is blended in an amount of 0.1 to 3 parts by weight, per 100 parts by weight of said polyvinyl chloride resin.

4. A powder molding polyvinyl chloride resin composition as claimed in claim 1, wherein said zinc salt is blended in an amount of 0.01 to 2 parts by weight, per 100 parts by weight of said polyvinyl chloride resins.

5. A powder molding composition as claimed in claim 1, wherein said zinc salt is at least one member selected from the group consisting of zinc laurate and zinc stearate.

6. A method as claimed in claim 2, wherein said barium salt is blended in an amount of 0.1 to 3 parts by weight, per 100 parts by weight of said polyvinyl chloride resin.

7. A method as claimed in claim 2, wherein said zinc salt is blended in an amount of 0.01 to 2 parts by weight, per 100 parts by weight of said polyvinyl chloride resin.

8. A method as claimed in claim 2, wherein said zinc salt is at least one member selected from the group consisting of zinc laurate and zinc stearate.

* * * * *